United States Patent Office — 3,060,215 — Patented Oct. 23, 1962

3,060,215
SILICON - CONTAINING DICYCLOPENTADIENYL-METAL COMPOUNDS AND POLYMERS AND METHODS FOR PREPARING SAME
Harold Rosenberg, 72 Barnwell Ave., Box 241, Medway, Ohio, and Marvin D. Rausch, 4210 Lesher Drive, Dayton, Ohio
No Drawing. Filed Mar. 16, 1959, Ser. No. 799,824
5 Claims. (Cl. 260—439)
(Granted under Title 35, U.S. Code (1952), sec. 266)

The invention described herein may be manufactured and used by and for the United States Government for governmental purposes without payment to us of any royalty thereon.

The instant invention relates to dicyclopentadienyl-metal compounds and to the methods by which they are prepared, and particularly to the preparation of silicon-containing dicyclopentadienylmetl compounds and polymers by a novel process involving the reaction of a cyclopentadienyl silane with a metalating agent and a metal halide.

As a background for imparting a clear understanding of the present invention as claimed, the first dicyclopentadienylmetal compound, dicyclopentadienyliron, to which the term ferrocene has been applied, was discovered in the year 1951 and was found to be a new type of aromatic system of unusual stability. A large number of such compounds, including a plurality of derivatives of each have since been prepared. This invention is concerned with one class thereof—those compounds and polymers containing silicon connected to the cyclopentadienyl rings of the dicyclopentadienylmetal derivatives.

A brief summary of the invention follows, indicating its nature and substance together with a statement of the objects of the invention commensurate and consistent with the invention as claimed and also setting out the exact nature, the operation and the essence of the invention complete with proportions and techniques that are necessary with its use. The purpose of the invention is also stipulated. The presentation is adequate for any person who is skilled in the art and science to which the invention pertains to use it without involving extensive experimentation. The best mode of carrying out the invention is presented by the citing of specific operative examples inclusive of the preparation and the use of at least one example of the invention.

The derivative materials of this invention are compounds and polymers which retain chemical and thermal stability over broad temperature ranges of the order of about −65° F. to about 700° F. Other objects that are achieved by this invention are that over such wide ranges of temperature silicon-containing dicyclopentadienylmetal compounds and polymers possess desirable physical properties that make them useful as base materials or components of lubricants, hydraulic fluids, elastomers, plastics, adhesives and additives thereof.

Although the instant invention may have use in the synthesis of a plurality of silicon-containing materials, it is particularly useful for the production of silicon-containing dicyclopentadienylmetal compounds having organosilyl radicals heteroannularly connected to nuclear carbon atoms in the cyclopentadienyl rings. Such materials and, particularly, 1,1'-bis(trisubstituted-silyl) dicyclopentadienylmetal compounds and poly-(disubstituted-silyl) dicyclopentadienylmetal polymers, have desirable physical properties and are especially suitable for fluid applications at extremely elevated temperatures of the order of about 700° F. and higher.

The use of an organometallic reagent, such as a Grignard or organolithium reagent, for the preparation of silicon-containing compounds generally is well-known. In the synthesis of organosilicon compounds and polymers, Grignard reagents have been used for the purpose of substituting a hydrocarbon radical, such as an alkyl or an aryl group, for a hydrolyzable radical (such as a halo or an alkoxy group) attached to a silicon atom in a silane. However, no Grigard reagents of dicyclopentadienylmetal compounds are known and thus this method cannot be utilized for the preparation of silicon-containing dicyclopentadienylmetal compounds. Benkeser et al., as described in the Journal of the American Chemical Society, volume 76, page 5491, 1954, obtained in low yields triphenylsilyldicyclopentadienyliron and 1,1'-bis(triphenylsilyl) dicyclopentadienyliron from the reaction of a mixture of mono- and dilithiodicyclopentadienyliron. This method poses the difficult problem of separating the mono- and the disubstituted products from each other and from the dicyclopentadienylmetal starting material. The instant invention overcomes this difficulty with regard to the preparation of 1,1'-bis(trisubstituted-silyl) dicyclopentadienylmetal ccmpounds by the use of a cyclopentadienylsilane with a metalating agent and a metal salt to prepare exclusively the desired disubstituted-dicyclopentadienylmetal derivative in materially improved yields.

The incorporation of various alkoxy and halo groups in silane radicals attached to the dicyclopentadienylmetal compounds and polymers makes possible the preparation of a number of silicon-containing compositions which can be used in the aforesaid applications, as well as chemical intermediates for the synthesis of more complex fluid, resin and elastomeric materials, as well as organic carriers of metals in high concentrations.

It is, therefore, an important object of the invention to provide an improved method for the preparation of silicon-containing dicyclopentadienylmetal derivatives.

A more specific object of the instant invention is to provide a process for the synthesis of 1,1'-bis(trisubstituted-silyl) dicyclopentadienylmetal compounds, which comprises reacting a cyclopentadienylsilane with a suitable metalating agent and then with a metal salt.

Still another object of the invention is to provide a process for the preparation of poly-(disubstituted-silyl) dicyclopentadienylmetal compositions in which dicyclopentadienylmetal groups in a linear polymer chain or network are connected by means of a disubstituted-silane group.

Other and further objects, features and advantages of the present invention will become apparent to those skilled in the art from the following detailed disclosure thereof.

Broadly, the instant invention consists of 1,1-bis(trisubstituted-silyl) dicyclopentadienylmetal compounds and poly-(disubstituted-silyl) dicyclopentadienylmetal derivatives, and a novel process of preparing same by reacting a cyclopentadienyl or bis(cyclopentadienyl) silane with a metalating agent and then reacting the metalated cyclopentadienylsilane with a metal salt to form the corresponding silicon-containing dicyclopentadienylmetal derivative.

An embodiment of the reaction of the instant invention may be represented by the following equation:

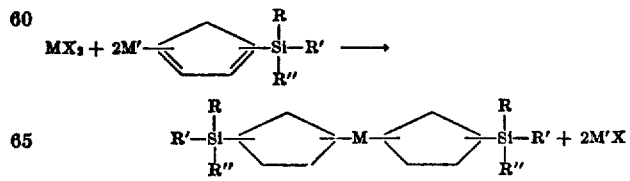

wherein M is a metal selected from the class consisting of iron, cobalt, nickel, ruthenium, osmium; M' is a metal selected from the class consisting of sodium, potassium, lithium, magnesium, and zinc; each R is a hydrocarbon radical selected from the class consisting of aliphatic, cycloaliphatic, aryl, alkaryl, aralkyl, and halogen-substituted derivatives of the aforesaid class of radicals; R' is the same as R or an alkoxy or a halo radical; R" is the same as R and R' or a cyclopentadienyl radical; and X is a halogen selected from the class of fluorine, chlorine, bromine and iodine. As indicated, the metal salt which reacted with two mols of the metalated cyclopentadienylsilane represented in the above equation reacts with the metal atom in each of two cyclopentadienylsilane molecules so as to form a "sandwich" link between the cyclopentadienyl rings. When R" is a cyclopentadienyl radical, polymers corresponding to the general formula

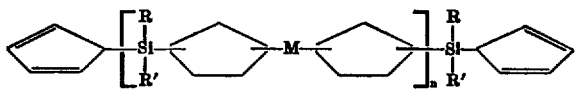

may be obtained, in which R, R' and M are the same as in the aforesaid equation and $n$ is a whole number equal to from 1 to 10.

The following examples illustrate the present invention:

Example 1

A solution of 88 parts by weight of cyclopentadienyltrimethylsilane in dry benzene is added over a period of 30 minutes to a solution of 70 parts of freshly prepared n-butyllithium in low-boiling petroleum ether. Stirring and a nitrogen atmosphere are maintained throughout the reaction. After the completion of the addition, the mixture is refluxed for one hour and cooled. Twenty parts by weight of anhydrous iron (II) chloride as a slurry in benzene are added and the reaction mixture is refluxed overnight. The solvent is removed and replaced with tetrahydrofuran. The mixture is stirred overnight at room temperature, decomposed in ice water and the organic solvent is removed. Diethyl ether is added and the phase system is filtered to remove the precipitate. The aqueous phase is extracted with ether and the combined ethereal phases are washed with water until neutral. The ether is removed and the residual liquid is distilled through a suitable column. The product, 1,1'-bis(trimethylsilyl) dicyclopentadienyliron, weighing 7.3 grams, is obtained in 50 percent yield as a dark red liquid with a boiling point of 104° C. at 150 microns pressure and having a refractive index of 1.5437 at 25° C.

*Anaylsis.*—Calc'd for $C_{16}H_{26}FeSi_2$: C, 58.16; H, 7.93; Fe, 16.90; Si, 17.00. Found: C, 58.13; H, 7.98; Fe, 16.60; Si, 16.82.

Example 2

The 1,1'-bis(tri-n-hexylsilyl) dicyclopentadienyliron with a refractive index of 1.5056 at 25° C. may be prepared essentially as described in Example 1 with the exception that cyclopentadienyltri-n-hexylsilane is used in place of the cyclopentadienyltrimethylsilane used in Example 1.

Example 3

1,1'-bis(ethoxydimethylsilyl) dicyclopentadienyliron may be obtained by the same method described in Example 1 with the exception that cyclopentadienyldimethylethoxysilane is employed in the place of the cyclopentadienyltrimethylsilane used in Example 1.

Example 4

1,1'-bis(triphenylsilyl) dicyclopentadienylcobalt may be prepared by the same method described in Example 1 except for the fact that cyclopentadienyltriphenylsilane is used in place of the cyclopentadienyltrimethylsilane, and cobalt(II)chloride is employed in place of the iron(II)-chloride utilized in Example 1 in essentially the same molar ratios.

Example 5

1,1'-bis(cyclopentadienyldimethylsilyl) dicyclopentadienyliron may be obtained essentially by the same method described in Example 3 with the exception that bis(cyclopentadienyl)dimethylsilane is employed in place of the cyclopentadienyltrimethylsilane, and in equimolar ratio in place of the 2:1 ratio with the iron(II)chloride used in Example 1. There is also obtained by this method poly-(1,1'-dicyclopentadienyliron) dimethylsilanes ranging 1 to 10 in number of repeating mer units.

Example 6

1,1'-bis(cyclopentadienyldimethylsilyl) dicyclopentadienylnickel may be obtained by the method described in Example 5 with the exception that nickel(II)chloride is employed in the same molar ratio in place of the iron(II)-chloride.

In the above described examples by definition the monovalent radical groups methyl and hexyl are aliphatic; the cyclopentadienyl group is a cycloaliphatic radical; the phenyl group in Example 4 is an aryl radical; and the ethoxy group in Example 3 is an alkoxy radical.

It is now apparent that other compositions may now be suggested to those skilled in the art without departing from our inventive concept, and reference should therefore be had to the appended claims to determine the scope of our invention.

What is claimed is:

1. 1,1'-bis(ethoxydimethylsilyl)dicyclopentadienyliron having the structural formula:

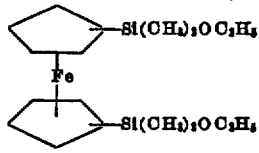

2. 1,1'-bis(cyclopentadienyldimethylsilyl)dicyclopentadienyliron having the structural formula:

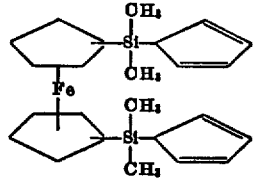

3. 1,1'-bis(cyclopentadienyldimethylsilyl)dicyclopentadienylnickel having the structural formula:

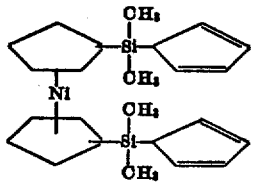

4. Poly-(1,1'-dicyclopentadienyliron)disubstitutedsilanes having the structural formula:

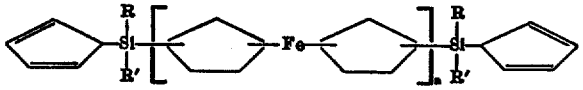

where R and R' are hydrocarbon radicals selected from the class consisting of aliphatic, cycloaliphatic, and aryl groups and halogen-substituted derivatives thereof, and alkoxy and halo radicals, and where $n$ is a whole number from 1 to 10.

5. The method of making 1,1'-bis(trimethylsilyl) dicyclopentadienyliron by combining, with continuous stirring and under a nitrogen atmosphere, 88 parts by weight of cyclopentadienyltrimethylsilane in dry benzene over a period of 30 minutes with a solution of 70 parts by weight of freshly prepared n-butyllithium in low-boiling petroleum ether; refluxing the mixture for one hour and then cooling the refluxed mixture to room temperature; adding to the refluxed mixture 20 parts by weight of anhydrous iron(II)chloride as a slurry in benzene and refluxing the reaction mixture overnight; removing the solvent and replacing the solvent with tetrahydrofuran; stirring the mixture overnight at room temperature and pressure; pouring the mixture over crushed ice and removing the organic solvent; adding diethyl ether to the mixture with stirring and removing the precipitate with filtration; extracting the aqueous phase of the filtrate with ether; combining the ethereal phases; washing with water the ethereal phases until they react neutral to litmus; removing the ether; distilling through a suitable column the residual liquid; and collecting the product.

References Cited in the file of this patent

UNITED STATES PATENTS

| | | |
|---|---|---|
| 2,667,501 | Martin | Jan. 26, 1954 |
| 2,810,737 | Haven | Oct. 22, 1957 |
| 2,831,880 | Benkeser | Apr. 22, 1958 |
| 2,848,506 | Breslow | Aug. 19, 1958 |

OTHER REFERENCES

Frisch: J.A.C.S., vol. 75, pp. 6050–6051, December 1953.

Rochow et al.: The Chemistry of Organometallic Compounds (1957), p. 250.

UNITED STATES PATENT OFFICE
CERTIFICATE OF CORRECTION

Patent No. 3,060,215                        October 23, 1962

Harold Rosenberg et al.

It is hereby certified that error appears in the above numbered patent requiring correction and that the said Letters Patent should read as corrected below.

In the heading to the printed specification, line 5, for "Barnwell" read -- Oaklawn --; column 1, line 18, for "dicyclopentadienylmetl" read -- dicyclopentadienylmetal --.

Signed and signed this 2nd day of July 1963.

(SEAL)
Attest:

ERNEST W. SWIDER
Attesting Officer

DAVID L. LADD
Commissioner of Patents